(12) United States Patent
Nose et al.

(10) Patent No.: US 11,075,375 B2
(45) Date of Patent: *Jul. 27, 2021

(54) CATHODE MIXTURE, ALL SOLID STATE BATTERY, METHOD FOR PRODUCING CATHODE MIXTURE, AND METHOD FOR PRODUCING ALL SOLID STATE BATTERY

(71) Applicant: TOYOTA JIDOSHA KABUSHIKI KAISHA, Toyota (JP)

(72) Inventors: Masafumi Nose, Susono (JP); Kazuya Takeuchi, Susono (JP); Yuki Ikeda, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/420,418

(22) Filed: May 23, 2019

(65) Prior Publication Data

US 2019/0372107 A1 Dec. 5, 2019

(30) Foreign Application Priority Data

Jun. 1, 2018 (JP) .............................. JP2018-106324
Apr. 23, 2019 (JP) .............................. JP2019-081880

(51) Int. Cl.
*H01M 4/36* (2006.01)
*H01M 4/136* (2010.01)
(Continued)

(52) U.S. Cl.
CPC ........... *H01M 4/364* (2013.01); *H01M 4/136* (2013.01); *H01M 4/5805* (2013.01);
(Continued)

(58) Field of Classification Search
CPC ...... H01M 4/364; H01M 4/136; H01M 4/625; H01M 10/058; H01M 4/5805;
(Continued)

(56) References Cited

U.S. PATENT DOCUMENTS 9,865,873 B2   1/2018  Nagata et al.
2012/0301778 A1  11/2012  Trevey et al.
(Continued)

FOREIGN PATENT DOCUMENTS

CN   105308774 A   2/2016
JP   2011-029139 A  2/2011
(Continued)

OTHER PUBLICATIONS

English Translation of JP5388069B2 (Year: 2014).*
(Continued)

*Primary Examiner* — Andrew J. Oyer
(74) *Attorney, Agent, or Firm* — Oliff PLC

(57) ABSTRACT

An object of the present disclosure is to produce a cathode mixture with less irreversible capacity. The present disclosure achieves the object by providing a cathode mixture comprising: a cathode active material including a S element; a sulfur containing compound including a P element and a S element; a conductive auxiliary material; and substantially no Li element; wherein when a diffraction intensity at $2\theta=15.5°$ in an X-ray diffraction measurement using a CuKα ray is regarded as $I_{15.5}$, a diffraction intensity at $2\theta=25°$ is regarded as $I_{25}$, and a diffraction intensity at $2\theta=40°$ is regarded as $I_{40}$, a standard value defined by the following formula is more than 1.2.

Standard value=$(I_{15.5}-I_{40})/(I_{25}-I_{40})$

13 Claims, 7 Drawing Sheets

(51) Int. Cl.
*H01M 4/62* (2006.01)
*H01M 10/058* (2010.01)
*H01M 4/58* (2010.01)
*H01M 10/44* (2006.01)
*H01M 10/0562* (2010.01)
*C01B 25/14* (2006.01)
*H01M 4/02* (2006.01)

(52) U.S. Cl.
CPC ......... *H01M 4/625* (2013.01); *H01M 10/058* (2013.01); *H01M 10/0562* (2013.01); *H01M 10/44* (2013.01); *C01B 25/14* (2013.01); *C01P 2002/72* (2013.01); *H01M 2004/028* (2013.01)

(58) Field of Classification Search
CPC ............. H01M 10/44; H01M 10/0562; H01M 2004/028; H01M 10/052; H01M 4/38; H01M 4/5815; H01M 10/446; H01M 4/628; H01M 10/0585; H01M 2004/021; C01B 25/14; C01P 2002/72
See application file for complete search history.

(56) References Cited

U.S. PATENT DOCUMENTS

| | | |
|---|---|---|
| 2013/0040208 A1 | 2/2013 | Kanno et al. |
| 2016/0118660 A1 | 4/2016 | Nagata et al. |
| 2016/0351964 A1 | 12/2016 | Jeong et al. |
| 2017/0317337 A1 | 11/2017 | Hayashi et al. |
| 2019/0051890 A1 | 2/2019 | Nose |
| 2019/0372104 A1 | 12/2019 | Nose |

FOREIGN PATENT DOCUMENTS

| | | |
|---|---|---|
| JP | 2011-181260 A | 9/2011 |
| JP | 5388069 B2 * | 1/2014 |
| JP | 5445809 B1 | 3/2014 |
| JP | 2014-160572 A | 9/2014 |
| JP | 2015-176849 A | 10/2015 |
| JP | 2017-091810 A | 5/2017 |
| JP | 2017-168434 A | 9/2017 |
| JP | 2017-168435 A | 9/2017 |
| JP | 2019-033067 A | 2/2019 |
| JP | 2019-212444 A | 12/2019 |
| WO | 2011/118801 A1 | 9/2011 |
| WO | 2016/063877 A1 | 4/2016 |

OTHER PUBLICATIONS

Tanibata et al. "A novel discharge-charge mechanism of a S-P2S5 composite electrode without electrolytes in all-solid-state Li/S batteries." Journal of Materials Chemistry A, May 9, 2017, vol. 5, pp. 11224-11228, plus Experimental Supplementary Information.
Aug. 19, 2020 Office Action issued in U.S. Appl. No. 16/419,687.
Yao, X. et al., "All-solid-state lithium batteries with inorganic solid electrolytes: Review of fundamental science" Chinese Phys. B., vol. 25, No. 1, 2016, pp. (018802-1)-(018802-14).
May 1, 2020 Office Action issued in U.S. Appl. No. 16/040,216.
Choi, H. U. et al. "Performance improvement of all-solid-state Li-S batteries with optimizing morphology and structure of sulfur composite electrode" Journal of Alloys and Compounds, vol. 723, 2017, pp. 787-794.
Suzuki, K. et al. "Composite Sulfur Electrode for All-solid-state Lithium-sulfur Battery with Li2S-GeS2-P2S5-based Thio-LISICON Solid Electrolyte" Electrochemistry, vol. 86, No. 1, 2018, pp. 1-5.
Oct. 23, 2020 Office Action issued in U.S. Appl. No. 16/040,216.
Mar. 1, 2021 Advisory Action issued in U.S. Appl. No. 16/040,216.
Mar. 17, 2021 Office Action issued in U.S. Appl. No. 16/419,687.

* cited by examiner

CATHODE MIXTURE, ALL SOLID STATE BATTERY, METHOD FOR PRODUCING CATHODE MIXTURE, AND METHOD FOR PRODUCING ALL SOLID STATE BATTERY

TECHNICAL FIELD

The present disclosure relates to a cathode mixture.

BACKGROUND ART

In accordance with the rapid spread of information-related apparatuses and communication devices such as a personal computer, a video camera, and a portable telephone in recent years, the development of a battery used for the power source thereof is regarded as important. Also in the automobile industry, the development of a battery with high out-put and high capacity for electric vehicles or hybrid vehicles is in progress.

The development of a sulfur battery using sulfur as a cathode active material is in progress. The sulfur has a feature that the theoretical capacity thereof is extremely high as 1675 mAh/g. Non-Patent Literature 1 discloses that a cathode mixture is produced by conducting mechanical milling to a mixture of sulfur (S), $P_2S_5$, and Ketjen black.

Also, Patent Literature 1 discloses a cathode mixture comprising sulfur and/or its corona product, an ion conductive material, and an activated carbon covered with a conductive material. Also, Patent Literature 2 discloses an all solid lithium sulfur battery comprising a cathode containing sulfur and a conductive material, an anode containing a lithium metal, and a solid electrolyte layer interposed between the cathode and the anode. Incidentally, Patent Literature 3 discloses an all solid state secondary battery using $Li_2S$—LiI—LiBr or $Li_2S$—LiI as a cathode active material.

CITATION LIST

Patent Literatures

Patent Literature 1: Japanese Patent Application Laid-Open (JP-A) No. 2015-176849
Patent Literature 2: JP-A No. 2017-168434
Patent Literature 3: International Publication No. WO2016/063877
Patent Literature 4: JP-A No. 2011-029139

Non-Patent Literature

Non-Patent Literature 1: N. Tanibata et al., "A novel discharge-charge mechanism of a S-P2S5 composite electrode without electrolytes in all-solid-state Li/S batteries", J. Mater. Chem. A, 2017 5 11224-11228

SUMMARY OF DISCLOSURE

Technical Problem

Higher performance of a battery has been required. The present disclosure has been made in view of the above circumstances, and a main object thereof is to provide a cathode mixture with irreversible capacity.

Solution to Problem

The present disclosure provides cathode mixture comprising: a cathode active material including a S element; a sulfur containing compound including a P element and a S element; a conductive auxiliary material; and substantially no Li element; wherein when a diffraction intensity at $2\theta=15.5°$ in an X-ray diffraction measurement using a CuKα ray is regarded as $I_{15.5}$, a diffraction intensity at $2\theta=25°$ is regarded as $I_{25}$, and a diffraction intensity at $2\theta=40°$ is regarded as $I_{40}$, a standard value defined by the following formula is more than 1.2.

Standard value=$(I_{15.5}-I_{40})/(I_{25}-I_{40})$

According to the present disclosure, the specific standard value allows the cathode mixture to have less irreversible capacity. Also, the cathode mixture comprises substantially no Li element so as to inhibit the capacity from being degraded in the cathode mixture.

In the disclosure, a proportion of the Li element may be 0 mol % or more and 20 mol % or less.
In the disclosure, the standard value may be 1.5 or more.
In the disclosure, the standard value may be 2.2 or less.
In the disclosure, a molar ratio of the P element to the S element (P/S) may be 0.12 or more and 0.27 or less.
In the disclosure, the cathode mixture may include a carbon material as the conductive auxiliary material.

The present disclosure also provides an all solid state battery comprising a cathode layer, a solid electrolyte layer, and an anode layer in this order; wherein the cathode layer comprises a cathode active material including a S element, a sulfur containing compound including a P element and a S element, a conductive auxiliary material, and substantially no Li element; and when a diffraction intensity at $2\theta=15.5°$ in an X-ray diffraction measurement using a CuKα ray is regarded as $I_{15.5}$, a diffraction intensity at $2\theta=25°$ is regarded as $I_{25}$, and a diffraction intensity at $2\theta=40°$ is regarded as $I_{40}$, the above described standard value is more than 1.2.

According to the present disclosure, the cathode layer has the specific standard value so as to allow the all solid state battery to have less irreversible capacity. Also, the cathode mixture comprises substantially no Li element so as to inhibit the capacity from being degraded in the all solid state battery.

The present disclosure also provides a method for producing a cathode mixture, the method comprising steps of: a preparing step of preparing a raw material mixture containing a cathode active material including a S element, a sulfide including a P element and a S element, a conductive auxiliary material, and substantially no Li element; and a mechanical milling step of conducting mechanical milling to the raw material mixture; wherein in the cathode mixture, when a diffraction intensity at $2\theta=15.5°$ in an X-ray diffraction measurement using a CuKα ray is regarded as $I_{15.5}$, a diffraction intensity at $2\theta=25°$ is regarded as $I_{25}$, and a diffraction intensity at $2\theta=40°$ is regarded as $I_{40}$, a standard value defined by the above described formula is more than 1.2.

According to the present disclosure, the production conditions are adjusted so as to obtain the specific standard value and thus the cathode mixture with less irreversible capacity may be obtained.

The present disclosure also provides a method for producing an all solid state battery, the method comprising steps of: a layered body forming step of forming a layered body including a cathode layer, a solid electrolyte layer, and an anode layer in this order; and an initial stage discharging step of initially discharging the layered body; wherein in the layered body forming step, the cathode layer is formed using the above described cathode mixture; and in the initial stage discharging step, discharging is carried out in an environment at a temperature of 60° C. or more.

According to the present disclosure, the cathode layer has the specific standard value so as to allow the all solid state battery to have less irreversible capacity. Also, the cathode mixture comprises substantially no Li element so as to inhibit the capacity from being degraded in the all solid state battery. Further, the layered body is initially discharged at a high temperature so as to obtain an all solid state battery with excellent high rate properties.

Advantageous Effects of Disclosure

The cathode mixture in the present disclosure exhibits an effect of less irreversible capacity.

DESCRIPTION OF EMBODIMENTS

Figure 1:
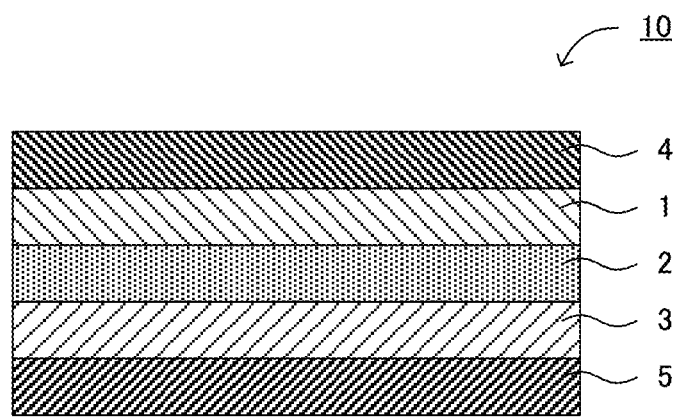
FIG. 1 is a schematic cross-sectional view illustrating an example of the all solid state battery in the present disclosure.

The cathode mixture, the all solid state battery, the method for producing the cathode mixture, and the method for producing the all solid state battery in the present disclosure will be hereinafter described in detail.

A. Cathode Mixture

The cathode mixture in the present disclosure comprises a cathode active material including a S element; a sulfur containing compound including a P element and a S element; and a conductive auxiliary material. Further, the cathode mixture in the present disclosure comprises substantially no Li element. Also, the cathode mixture in the present disclosure has the specific standard value based on the diffraction intensity measured in an XRD measurement.

According to the present disclosure, the specific standard value allows the cathode mixture to have less irreversible capacity. Also, the cathode mixture comprises substantially no Li element so as to inhibit the capacity from being degraded in the cathode mixture.

As described above, Non-Patent Literature 1 discloses a cathode mixture using a mixture of sulfur (S), $P_2S_5$, and Ketjen black as raw materials. However, as described in Reference Example 1 later, the cathode mixture synthesized in Non-Patent Literature 1 had low amorphousness and much irreversible capacity. On the other hand, the cathode mixture in the present disclosure has high amorphousness. In other words, the cathode active material, the sulfur containing compound, and the conductive auxiliary material are highly dispersed to each other; thus, the irreversible capacity may be less.

Here, in the present disclosure, the cathode mixture having high amorphousness is specified by the specific standard value. As described in Examples later, the higher the amorphousness of the cathode mixture in the present disclosure, the diffraction intensity in broad peaks (halo pattern) appears in the range of 2θ=10 to 20° becomes larger. In order to express this point, used is the standard value defined by the following formula:

Standard value=$(I_{15.5}-I_{40})/(I_{25}-I_{40})$.

$I_{15.5}$ is the diffraction intensity at 2θ=15.5°, $I_{25}$ is the diffraction intensity at 2θ=25°, and $I_{40}$ is the diffraction intensity at 2θ=40°. Incidentally, these peak positions can be measured by an X-ray diffraction measurement using a CuKα ray. As shown in the later described FIG. 4, $I_{15.5}$ is the diffraction intensity relating to the broad peaks appear in the range of 2θ=10° to 20°. On the other hand, $I_{25}$ is the diffraction intensity relating to the broad peaks appear in the range of 2θ=20° to 30°. Also, $I_{40}$ is the diffraction intensity at the position not easily affected by the amorphousness of the cathode mixture, and is a reference that specifies the relation of $I_{15.5}$ and $I_{25}$.

The standard value is usually larger than 1.2, may be 1.3 or more, may be 1.4 or more, and may be 1.5 or more. Meanwhile, there are no particular limitations on the standard value, but it is 3 or less for example, may be 2.5 or less, may be 2.2 or less, and may be 1.8 or less.

Also, the cathode mixture in the present disclosure comprises substantially no Li element so as to inhibit the capacity from being degraded. Here, a cathode mixture containing an ion conductor (solid electrolyte) including a Li element has been known. For example, when an ion conductor using $Li_2S$ is used as a raw material, a battery using such a cathode mixture in a cathode layer tends to have low capacity since the water resistance of $Li_2S$ is low. To solve the problem, the cathode mixture in the present disclosure comprises substantially no Li element (that is, $Li_2S$) so as to inhibit the capacity from being degraded.

"Comprising substantially no Li element" signifies that the proportion of the Li element to all the elements included in the cathode mixture is 20 mol % or less. The proportion of the Li element may be 16 mol % or less, may be 8 mol % or less, may be 4 mol % or less, and may be 0 mol %. Also, the cathode mixture in the present disclosure may contain substantially no Na element. "Containing substantially no Na element" signifies that the proportion of the Na element to all the elements included in the cathode mixture is 20 mol % or less. The proportion of the Na element may be 16 mol % or less, may be 8 mol % or less, may be 4 mol % or less, and may be 0 mol %.

1. Cathode Active Material

The cathode active material includes a S element. Above all, the cathode active material is preferably elemental sulfur. Examples of the elemental sulfur may include $S_8$ sulfur. The $S_8$ sulfur has three crystal forms of αsulfur (rhombic sulfur), βsulfur (monoclinic sulfur), and γsulfur (monoclinic sulfur), but any of them may be applicable.

When the cathode mixture contains the elemental sulfur as a cathode active material, the cathode mixture may and may not have the peak of the elemental sulfur in an XRD measurement. The typical peaks of the elemental sulfur appear at $2\theta=23.05°\pm0.50°$, $25.849°\pm0.50°$, and $27.70°\pm0.50°$ in an XRD measurement using a CuKα ray. These peak positions may be respectively $\pm0.30°$, and may be $\pm0.10°$.

A part or whole of the elemental sulfur may be dissolved in the later described sulfur containing compound. In other words, the cathode mixture may contain a solid solution of the elemental sulfur and the sulfur containing compound. Also, a S element in the elemental sulfur and a S element in the sulfur containing compound may have a chemical bond (S—S bond). Incidentally, the content of the cathode active material in the cathode mixture is the same as the content of the cathode active material in the later described raw material mixture; thus, the description herein is omitted.

2. Sulfur Containing Compound

The cathode mixture in the present disclosure comprises at least a sulfur containing compound including a P element and a S element as the sulfur containing compound. The cathode mixture may contain just the sulfur containing compound including a P element and a S element, and may further contain a sulfur containing compound including another element (such as Ge, Sn, Si, B, or Al) and a S element. In the latter case, the cathode mixture preferably contains the sulfur containing compound including a P element and a S element as the main body of the sulfur containing compound.

Meanwhile, the sulfur containing compound in the present disclosure substantially contains no Li element. Also, it is preferable that the sulfur containing compound becomes an ion conducting path during charge and discharge. Here, Li ions are conducted from the anode layer to the cathode layer via the solid electrolyte layer during discharge, and the Li ions reached at the cathode layer react with cathode active materials. When the sulfur containing compound is not present in the cathode layer, the ion conductivity of the corona product (such as $Li_2S$) is low; thus the discharge reaction does not easily proceed due to lack of the ion conducting path in the cathode layer. On the other hand, when the sulfur containing compound is present in the cathode layer, the ion conducting path in the cathode layer is secured by the sulfur containing compound and thus the discharge reaction easily proceeds even if the ion conductivity of the corona product (such as $Li_2S$) is low.

The sulfur containing compound preferably contains an ortho structural skeleton of a P element. The ortho structural skeleton of a P element is specifically a $PS_4$ structural skeleton. Also, sulfur containing compound may contain an ortho structural skeleton of an M element (M is, for example, Ge, Sn, Si, B or Al). Examples of the ortho structural skeleton of the M element may include a $GeS_4$ structural skeleton, a $SnS_4$ structural skeleton, a $SiS_4$ structural skeleton, a $BS_3$ structural skeleton, and an $AlS_3$ structural skeleton. Meanwhile, the sulfur containing compound may contain the sulfide of a P element (such as $P_2S_5$). Also, the sulfur containing compound may include the sulfide of an M element ($M_xS_y$). Here, "x" and "y" are respectively an integer that gives the compound electrical neutrality with an S element according to the kind of M. Examples of the sulfide ($M_xS_y$) may include $GeS_2$, $SnS_2$, $SiS_2$, $B_2S_3$, and $Al_2S_3$. Also, these sulfides are, for example, the residue of the starting material.

The cathode mixture may and may not have the peak of the sulfide in an XRD measurement. The typical peaks of $P_2S_5$ appear at $2\theta=25.84°\pm0.50$, $30.35°\pm0.50°$, and $31.32°\pm0.50°$ in an XRD measurement using a CuKα ray. The typical peaks of $GeS_2$ appear at $2\theta=15.430\pm0.50°$, $26.50°\pm0.50°$, and $28.60°\pm0.50°$ in an XRD measurement using a CuKα ray. Also, the typical peaks of $SnS_2$ appear at $2\theta=15.02°\pm0.50°$, $32.11°\pm0.50°$, and $46.14°\pm0.50°$ in an XRD measurement using a CuKα ray. Also, the typical peaks of $SiS_2$ appear at $2\theta=18.36°\pm0.50°$, $29.36°\pm0.50°$, and $47.31°\pm0.50°$ in an XRD measurement using a CuKα ray. These peak positions may be respectively $\pm0.30°$, and may be $\pm0.109$.

Also, as described above, a S element in the sulfur containing compound and a S element in the elemental sulfur (cathode active material) may have a chemical bond (S—S bond). In particular, it is preferable that the S element in the ortho structural skeleton and the S element in the elemental sulfur (cathode active material) have a chemical bond (S—S bond). Incidentally, the content of the sulfur containing compound in the cathode mixture is the same as the content of the sulfide in the later described raw material mixture; thus the description herein is omitted.

3. Conductive Auxiliary Material

The conductive auxiliary material has a function of improving the electron conductivity of the cathode mixture. Also, it is presumed that the conductive auxiliary material functions as a reductant that reduces the elemental sulfur on the occasion such as when mechanical milling is conducted to the raw material mixture. The conductive auxiliary material is preferably present in the state dispersed in the cathode mixture.

Examples of the conductive auxiliary material may include a carbon material and a metal material. Examples of the carbon material may include vapor growth carbon fiber (VGCF), acetylene black, activated carbon, furnace black, carbon nanotube, Ketjen black, and graphene. Incidentally, the content of the conductive auxiliary material in the cathode mixture is the same as the content of the conductive auxiliary material in the later described raw material mixture; thus, the description herein is omitted.

4. Cathode Mixture

The cathode mixture in the present disclosure comprises: a cathode active material including a S element; a sulfur containing compound including a P element and a SS element; and a conductive auxiliary material. The cathode mixture may contain just the cathode active material, the sulfur containing compound, and the conductive auxiliary material, and may further contain an additional material.

In the cathode mixture, there are no particular limitations on the molar ratio (P/S) of the P element to the S element; for example, it is 0.03 or more, may be 0.06 or more, may be 0.09 or more, and may be 0.12 or more. Meanwhile, the molar ratio (P/S) is, for example, 0.5 or less, may be 0.3 or less, and may be 0.27 or less. Incidentally, the denominator of the molar ratio (P/S) signifies the amount of all the S elements included in the cathode mixture; since both the cathode active material and the sulfur containing compound in the present disclosure include a S element, the amount of the both S elements are summed.

Also, the cathode mixture in the present disclosure may include an M element (M is Ge, Sn, Si, B, or Al), and may not include the M element.

B. All Solid State Battery

FIG. 1 is a schematic cross-sectional view illustrating an example of the all solid state battery in the present disclosure. All solid state battery 10 illustrated in FIG. 1 comprises cathode layer 1, solid electrolyte layer 2, and anode layer 3 in this order. All solid state battery 10 further comprises cathode current collector 4 for collecting currents of cathode layer 1, and anode current collector 5 for collecting currents of anode layer 3. Cathode layer 1 comprises: a cathode active material including a S element; a sulfur containing compound including a P element and a S element; a conductive auxiliary material; and substantially no Li element. In addition, cathode layer 1 has the specific standard value based on the diffraction intensity measured in an XRD measurement.

According to the present disclosure, the cathode layer has the specific standard value so as to allow the all solid state battery to have less irreversible capacity. Also, the cathode mixture comprises substantially no Li element so as to inhibit the capacity from being degraded in the all solid state battery.

1. Cathode Layer

The cathode layer comprises: a cathode active material including a S element; a sulfur containing compound including a P element and a S element; and a conductive auxiliary material. Meanwhile, the cathode layer comprises substantially no Li element. Further, the cathode layer satisfies the specific standard value. The cathode active material, the sulfur containing compound, the conductive auxiliary material, the specific standard value, and the other items are in the same contents as those described in "A. Cathode mixture" above; thus, the descriptions herein are omitted.

The thickness of the cathode layer is, for example, 0.1 μm or more and 1000 μm or less. Also, the weight of the cathode layer is, for example, larger than 3 mg/cm$^2$, may be 4 mg/cm$^2$ or more, and may be 5 mg/cm$^2$ or more. Also, the cathode layer may be obtained by, for example, pressing the above described cathode mixture.

2. Anode Layer

The anode layer is a layer containing at least an anode active material. The anode active material preferably includes a Li element. Examples of such an anode active material may include a simple substance of lithium and a lithium alloy. Examples of the lithium alloy may include Li—In alloy. The anode active material preferably includes a Na element. Examples of such an anode active material may include a simple substance of sodium and a sodium alloy.

The anode layer may contain at least one of a solid electrolyte, a conductive auxiliary material, and a binder, as required. The conductive auxiliary material is in the same contents as those described for the cathode layer above. Examples of the binder may include a fluorine-based binder such as polyvinylidene fluoride (PVDF). Also, the thickness of the anode layer is, for example, 0.1 μm or more and 1000 μm or less.

3. Solid Electrolyte Layer

The solid electrolyte layer is a layer formed between the cathode layer and the anode layer. Also, the solid electrolyte layer is a layer containing at least a solid electrolyte, and may contain a binder as required.

Examples of the solid electrolyte may include a sulfide solid electrolyte, an oxide solid electrolyte, a nitride solid electrolyte, and a halide solid electrolyte. Above all, the sulfide solid electrolyte is preferable. The sulfide solid electrolyte preferably includes a Li element, an A element (A is at least one kind of P, Ge, Si, Sn, B, and Al), and a S element. The sulfide solid electrolyte may further include a halogen element. Examples of the halogen element may include a F element, a Cl element, a Br element, and an I element. Also, the sulfide solid electrolyte may further include an O element.

Examples of the sulfide solid electrolyte may include $Li_2S$—$P_2S_5$, $Li_2S$—$P_2S_5$—LiI, $Li_2S$—$P_2S_5$—$GeS_2$, $Li_2S$—$P_2S_5$—$Li_2O$, $Li_2S$—$P_2S_5$—$Li_2O$—LiI, $Li_2S$—$P_2S_5$—LiI—LiBr, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (provided that m, n is a real number; Z is either one of Ge, Zn, and Ga), $Li_2S$—$GeS_2$, $Li_2S$—$SiS_2$—$Li_3PO_4$, and $Li_2S$—$SiS_2$-$Li_xMO_y$ (provided that x, y is a real number; M is either one of P, Si, Ge, B, Al, Ga, and In).

The proportion of the solid electrolyte included in the solid electrolyte layer is, for example, 50 volume % or more, may be 70 volume % or more, and may be 90 volume % or more. Incidentally, the binder to be used in the solid electrolyte layer is in the same contents as those described for the anode layer above. Also, the thickness of the solid electrolyte layer is, for example, 0.1 μm or more and 1000 μm or less.

4. All Solid State Battery

The all solid state battery in the present disclosure comprises the above described cathode layer, anode layer, and solid electrolyte layer, and usually further comprises a cathode current collector for collecting currents of the cathode layer, and an anode current collector for collecting currents of the anode layer. Examples of the material for the cathode current collector may include SUS, aluminum, nickel, iron, titanium, and carbon. On the other hand, examples of the material for the anode current collector may include SUS, copper, nickel, and carbon.

The all solid state battery in the present disclosure is preferably a sulfur battery. The sulfur battery signifies a battery using an elemental sulfur as a cathode active material. The all solid state battery in the present disclosure may be a lithium sulfur battery (LiS battery), and may be a sodium sulfur battery (NaS battery). Also, the all solid state battery may be a primary battery and may be a secondary battery, but the latter is preferable among them since it may be repeatedly charged and discharged, and is useful as, for example, a car-mounted battery. Incidentally, the secondary battery includes a usage of a secondary battery as a primary battery (the use for the purpose of just one time discharge after charge).

C. Method for Producing Cathode Mixture

Figure 2:
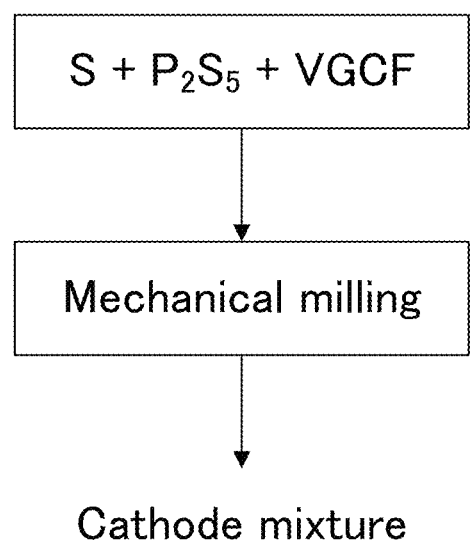
FIG. 2 is a flow chart explaining an example of the method for producing the cathode mixture in the present disclosure.

FIG. 2 is a flow chart explaining an example of the method for producing the cathode mixture in the present disclosure. In FIG. 2, first, a mixture containing an elemental sulfur (S), a sulfide ($P_2S_5$), and a conductive auxiliary material (VGCF) is prepared as the raw material mixture of the cathode mixture (preparing step). Next, mechanical milling is conducted to the raw material mixture (mechanical milling step). In the present disclosure, the production conditions are adjusted so as to obtain the cathode mixture with the specific standard value. The cathode mixture with the specific standard value may be obtained by, for example, adjusting the composition of the raw material mixture and the conditions of the mechanical milling.

According to the present disclosure, the production conditions are adjusted so as to obtain the specific standard value and thus the cathode mixture with less irreversible capacity may be obtained. Also, the raw material composition comprising substantially no Li element is used so as to obtain the cathode mixture of which capacity is inhibited from being degraded. Also, the mechanical milling forms an excellent three-phase interface where the cathode active material, the sulfur containing compound that can be an ion conducting path, and the conductive auxiliary material that can be an electron conducting path, coexist. Thereby, the charge and discharge capacities may be improved.

1. Preparing Step

The preparing step is a step of preparing a raw material mixture containing a cathode active material including a S element, a sulfide including a P element and a S element, a conductive auxiliary material, and substantially no Li element. The raw material mixture may be fabricated by one's own, and may be purchased from others.

The raw material mixture may contain just the cathode active material, the sulfide, and the conductive auxiliary material, and may further contain an additional material. Also, it is preferable that the raw material mixture substantially contains no Li element. In the same manner, it is preferable that the raw material mixture substantially contains no Na element.

The cathode active material is preferably an elemental sulfur. The purity of the elemental sulfur is preferably high. The raw material mixture may contain just the sulfide of a P element, and may contain the sulfide of an additional element. Examples of the sulfide of the additional element may include $GeS_2$, $SnS_2$, $SiS_2$, $B_2S_3$, and $Al_2S_3$. The raw material mixture may contain just one kind of the sulfide of the additional element, and may contain two kinds or more thereof. The conductive auxiliary material is in the same contents as those described in "A. cathode mixture" above.

The content of the cathode active material in the raw material mixture may be, for example, 10 weight % or more, may be 20 weight % or more, and may be 25 weight % or more. If the content of the cathode active material is too little, the cathode mixture with sufficient capacity may not be obtained in some cases. Meanwhile, the content of the cathode active material in the raw material mixture may be, for example, 80 weight % or less, may be 70 weight % or less, and may be 60 weight % or less. If the content of the cathode active material is too much, the ion conductivity and the electron conductivity in the cathode layer may be insufficient in some cases.

The content of the sulfide (particularly the sulfide containing a P element and a S element) in the raw material mixture may be, for example, 10 weight % or more, and may be 20 weight % or more. If the content of the sulfide is too little, the ion conductivity in the cathode layer may be insufficient in some cases. Meanwhile, the content of the sulfide in the raw material mixture may be, for example, 80 weight % or less, and may be 70 weight % or less. If the content of the sulfide is too much, the content of the cathode active material becomes relatively little, and the cathode mixture with sufficient capacity may not be obtained in some cases.

The content of the conductive auxiliary material in the raw material mixture may be, for example, 5 weight % or more, and may be 10 weight % or more. If the content of the conductive auxiliary material is too little, the electron conductivity in the cathode layer may be insufficient in some cases. Meanwhile, the content of the conductive auxiliary material in the raw material mixture may be, for example, 50 weight % or less, and may be 40 weight % or less. If the content of the conductive auxiliary material is too much, the content of the cathode active material becomes relatively little, and the cathode mixture with sufficient capacity may not be obtained in some cases.

In the raw material mixture, the weight ratio of the sulfide (particularly the sulfide containing a P element and a S element) to the cathode active material is, for example, 0.4 or more, may be 0.5 or more, and may be 0.6 or more. Meanwhile, the weight ratio is, for example, 5 or less, may be 4 or less, and may be 3 or less.

2. Mechanical Milling Step

The mechanical milling step is a step of conducting mechanical milling to the raw material mixture. The raw material mixture is amorphized by mechanical milling and thereby the cathode mixture is obtained.

There are no particular limitations on the mechanical milling if it is a method in which the cathode mixture is mixed while applying a mechanical energy thereto, and examples thereof may include ball milling, vibration milling, turbo milling, mechano-fusion, and disc milling. Above all, planetary ball milling is particularly preferable.

The mechanical milling may be dry mechanical milling and may be wet mechanical milling. The liquid to be used in the wet mechanical milling is preferably aprotonic to the extent hydrogen sulfide is not generated. Specific examples of the aprotonic liquid may include polar aprotonic liquid and nonpolar aprotonic liquid.

The conditions for the mechanical milling are appropriately arranged so as to obtain the desired cathode mixture. For example, when planetary ball milling is used, the raw material mixture and balls for crushing thereof are added to a container, and the treatment is conducted with specific weighing table rotation number and for specific time. The weighing table rotation number is, for example, 200 rpm or more, may be 300 rpm or more, and may be 510 rpm or more. Meanwhile, the weighing table rotation number is, for example, 800 rpm or less, and may be 600 rpm or less. Also, the treatment time of the planetary ball milling is, for example, 30 minutes or more, and may be 5 hours or more. Meanwhile, the treatment time of the planetary ball milling is, for example, 100 hours or less, and may be 60 hours or less. Examples of the material of the container and ball for crushing to be used in the planetary ball milling may include $ZrO_2$ and $Al_2O_3$. The diameter of the ball for crushing is, for example, 1 mm or more and 20 mm or less. The mechanical milling is preferably conducted in an inert gas atmosphere (such as Ar gas atmosphere).

3. Cathode Mixture

The cathode mixture obtained by the above described production method is in the same contents as those described in "A. Cathode mixture" above; thus, the descriptions herein are omitted. Also, the present disclosure may also provide a cathode mixture which features to be obtained by the above described production method.

D. Method for Producing all Solid State Battery

Figure 3:
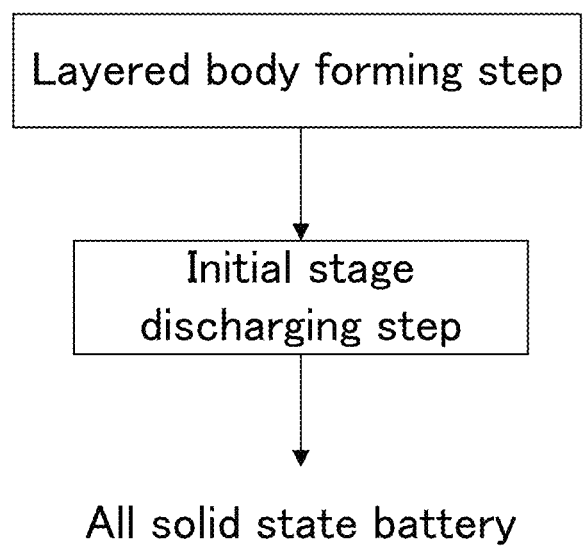
FIG. 3 is a flow chart explaining an example of the method for producing the all solid state battery in the present disclosure.

FIG. 3 is a flow chart explaining an example of the method for producing the all solid state battery in the present disclosure. In FIG. 3, a layered body including a cathode layer, a solid electrolyte layer, and an anode layer in this order, is formed (layered body forming step). On this occasion, the cathode layer is formed using the above described cathode mixture. Next, the layered body is initially charged in an environment at comparatively high temperature (initial stage discharging step). Thereby, an all solid state battery is obtained.

According to the present disclosure, the cathode layer has the specific standard value so as to allow the all solid state battery to have less irreversible capacity. Also, the cathode mixture comprises substantially no Li element so as to inhibit the capacity from being degraded in the all solid state battery. Further, the layered body is initially discharged at a high temperature so as to obtain an all solid state battery with excellent high rate properties. In specific, an all solid state battery in which degrade of discharge capacity is inhibited may be obtained even when the discharge rate is set high. The reason why degrade of discharge capacity is inhibited is presumably because the ion conductivity in the battery overall becomes high at a high temperature, and thus the conduction of the initial stage discharge in such a state may facilitate the formation of ion conducting path.

1. Layered Body Forming Step

The layered body forming step in the present disclosure is a step of forming a layered body including a cathode layer, a solid electrolyte layer, and an anode layer in this order. Further, the cathode layer is formed using the cathode mixture described in "A. Cathode mixture" above. Also, the layered body includes at least a cathode layer, a solid electrolyte layer, and an anode layer, and may further include a cathode current collector and an anode current collector. The solid electrolyte layer, the anode layer, and the other members are in the same contents as those described in "B. All solid state battery" above; thus, the descriptions herein are omitted.

Examples of the method for forming the layered body may include a pressing method. Also, there are no particular limitations on the order of forming the layered body. For example, the solid electrolyte layer may be formed by pressing, and then the cathode layer may be formed on one surface side of the solid electrolyte layer by pressing, and then, the anode layer may be formed on the other surface side of the solid electrolyte layer by pressing. Also, two or more layers of the cathode layer, the solid electrolyte layer, and the anode layer may be formed at the same time by pressing. Also, slurry may be used on the occasion of forming the cathode layer, the solid electrolyte layer, and the anode layer.

The pressure during pressing is, for example, 0.1 ton/cm$^2$ or more, may be 0.5 ton/cm$^2$ or more, and may be 1 ton/cm$^2$ or more. Meanwhile, the pressure during pressing is, for example, 10 ton/cm$^2$ or less, may be 8 ton/cm$^2$ or less, and may be 6 ton/cm$^2$ or less.

2. Initial Stage Discharging Step

The initial stage discharging step in the present disclosure is a step of initially discharging the layered body. The initial discharging is usually carried out in the environment at the temperature of 60° C. or more. The temperature environment may be 80° C. or more, and may be 100° C. or more. Meanwhile, the temperature environment is, for example, 200° C. or less. Incidentally, usually, the layered body is initially discharged in the state where the surface temperature of the layered body is the same as the environment temperature.

In the present disclosure, "initially/initial stage" is clearly distinguished from "first". "Initially/initial stage" is a concept that includes "first", and is a broader concept than that of "first". For example, the first discharge literally means discharge at the first time; however, the initial discharge needs not to be necessarily discharge at the first time. For example, for the purpose of avoiding infringement of the patent right, even when charge and discharge are carried out a few times which does not match the condition above, if discharge that matches the condition above is carried out after that, that step corresponds to the initial stage discharging step in the present disclosure. It is preferable that the initial stage discharging is, for example, the discharge of first time or more and 10$^{th}$ time or less.

There are no particular limitations on the discharge rate in the initial stage discharging; for example, it is 0.01 C or more, may be 0.05 C or more, and may be 0.1 C or more. Meanwhile, the discharge rate in the initial stage discharging is, for example, 0.5 C or less, and may be 0.33 C or less.

Also, in the present disclosure, a low temperature environment discharging step of discharging the layered body in an environment at a lower temperature than that of the initial stage discharging step may be carried out after the initial stage discharging step. The temperature environment in this step is, for example, less than 60° C., may be 55° C. or less, and may be 50° C. or less.

3. All Solid State Battery

The all solid state battery obtained by each of the above described step is in the same contents as those described in "B. All solid state battery" above; thus, the descriptions herein are omitted. Also, it is preferable that the all solid state battery in the present disclosure is a battery of which temperature environment during usage is less than 60° C. The temperature environment during usage is, for example, 55° C. or less, and may be 50° or less.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Hereinafter, the present disclosure will be described more specifically with reference to Examples. Incidentally, each operation such as weighing, synthesizing and drying was carried out under Ar atmosphere, unless otherwise indicated.

Example 1

<Production of Cathode Mixture>

An elemental sulfur (cathode active material, from Kojundo Chemical Lab. Co., Ltd.), $P_2S_5$(sulfide), and VGCF (conductive auxiliary material) were prepared. These were weighed so as to be in the weight ratio shown in Table 1, and each raw material was kneaded in an agate mortar for 15 minutes to obtain a raw material mixture. The obtained raw material mixture was projected into a container (45 cc, made of $ZrO_2$) for planetary ball milling, further, $ZrO_2$ balls ($\phi$=4 mm, 96 g) were projected thereinto, and the container was completely sealed. This container was installed to a planetary ball milling machine (P7 from Fritsch Japan Co., Ltd), and a cycle of, mechanical milling for 1 hour (weighing table rotation number of 510 rpm), 15 minutes pause, mechanical milling for 1 hour in reverse turn (weighing table rotation number of 510 rpm), and 15 minutes pause, was repeated to carry out the mechanical milling for total of 48 hours. Thereby, a cathode mixture was obtained.

<Fabrication of all Solid State Battery>

A solid electrolyte of 100 mg was placed in 1 cm$^2$ ceramic mold and pressed under 1 ton/cm$^2$ to obtain a solid electrolyte layer. The cathode mixture of 7.8 mg (weight: 7.8 mg/cm$^2$) was placed on one side of the solid electrolyte layer and pressed under 6 ton/cm$^2$ to fabricate a cathode layer. On the other side, a lithium metal foil was placed as an anode layer and pressed under 1 ton/cm$^2$ to obtain a power generating element. An Al foil (cathode current collector) was placed on the cathode layer side, and a Cu foil (anode current collector) was placed on the abode layer side. Thereby, an all solid state battery was obtained.

Examples 2 to 6 and Comparative Example 1

A cathode mixture and an all solid state battery were obtained in the same manner as in Example 1 except that each raw material was weighed so as to be in the weight ratio shown in Table 1.

TABLE 1

|  | Comparative Example 1 | Example 1 | Example 2 | Example 3 | Example 4 | Example 5 | Example 6 |
|---|---|---|---|---|---|---|---|
| S [g] | 1.05 | 1.05 | 1.34 | 1.05 | 1.05 | 1.05 | 0.61 |
| $P_2S_5$ [g] | 0.385 | 0.635 | 1.09 | 0.852 | 1.38 | 2.43 | 1.82 |
| C [g] | 0.57 | 0.57 | 0.57 | 0.57 | 0.57 | 0.57 | 0.57 |
| $P_2S_5/S$ weight ratio | 0.37 | 0.60 | 0.81 | 0.81 | 1.31 | 2.31 | 2.98 |
| P/S molar ratio | 0.08 | 0.12 | 0.15 | 0.15 | 0.19 | 0.25 | 0.27 |

EVALUATION

<X-Ray Diffraction Measurement>

Figure 4:
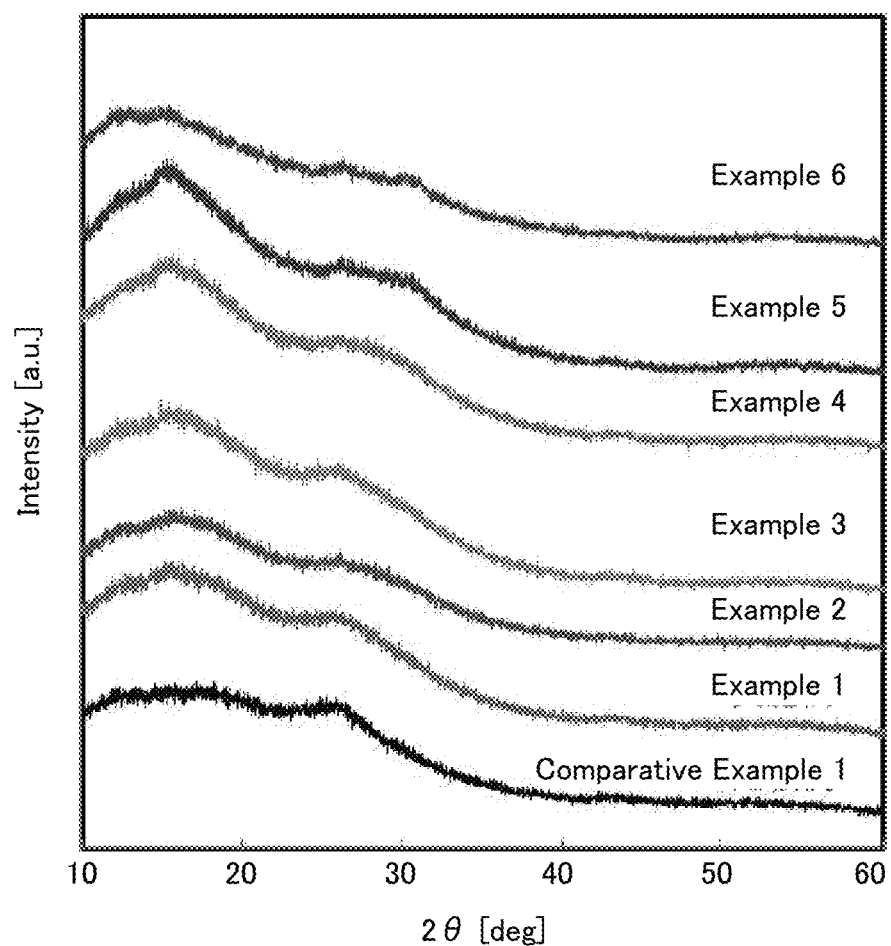
FIG. 4 is the result of an XRD measurement for the cathode mixtures obtained in Examples 1 to 6 and Comparative Example 1.
Figure 5A:
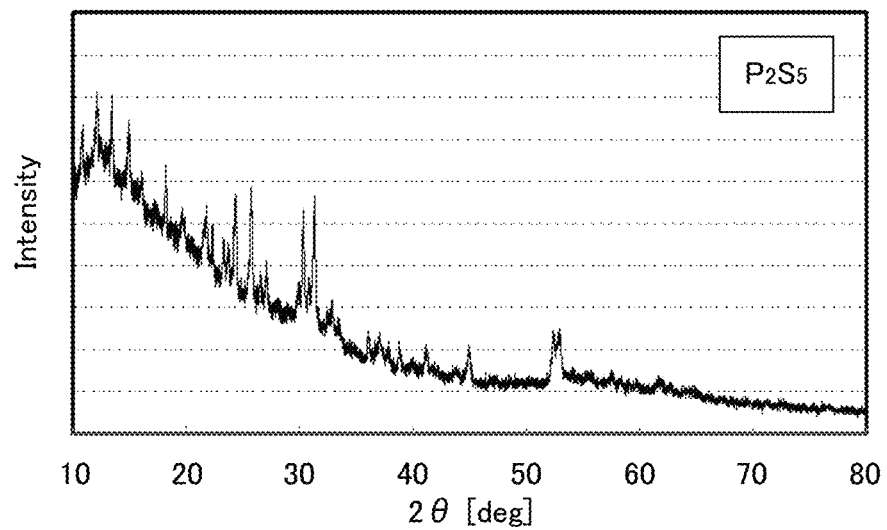
FIGS. 5A and 5B are the results of an XRD measurement for the raw materials ($P_2S_5$ and S) in Example 1.
Figure 5B:
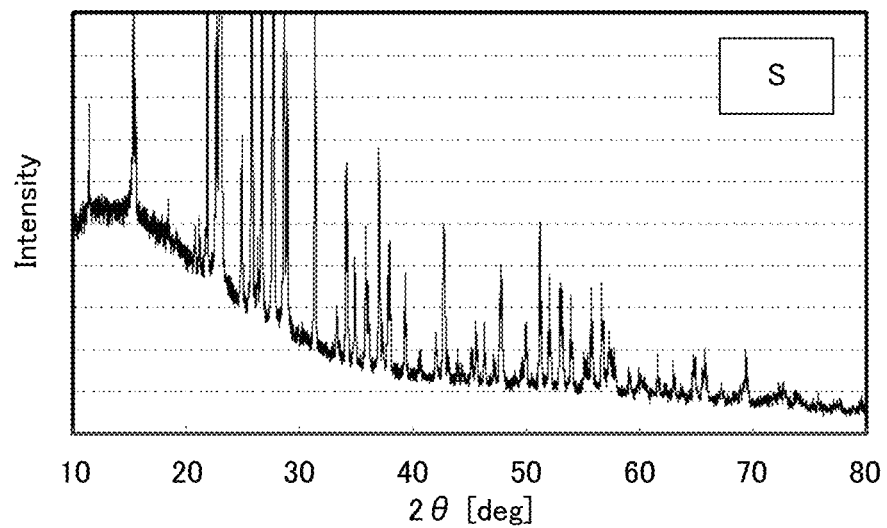

An X-ray diffraction (XRD) measurement using a CuKα ray was conducted for the cathode mixtures obtained in Examples 1 to 6 and Comparative Example 1. The results are shown in FIG. 4. Also, for reference, the results of an XRD measurement for the raw material $P_2S_5$ and S are shown in FIGS. 5A and 5B. As shown in FIG. 4 and FIGS. 5A and 5B, it was confirmed that the cathode mixture after the mechanical milling was sufficiently amorphized. Also, in the comparison of the result shown in FIG. 4 with the result described in FIG. 1(a) in Non-Patent Literature 1, the broad peaks (halo pattern) in the range of 2θ=10° to 20° were confirmed in Examples 1 to 6 while such a peak was not confirmed in FIG. 1(a) in Non-Patent Literature 1. From these results, it was confirmed that the cathode mixtures with higher amorphousness were obtained in Examples 1 to 6.

Also, from the obtained result of the XRD, the diffraction intensity at 2θ=15.5° ($I_{15.5}$), the diffraction intensity at 2θ=25° ($I_{25}$) and the diffraction intensity at 2θ=40° ($I_{40}$) were obtained to calculate the standard value defined by the following formula:

Standard value=$(I_{15.5}-I_{40})/(I_{25}-I_{40})$.

This standard value is an index of amorphousness; the larger standard value signifies the higher amorphousness. Also, as Reference Example 1, the standard value was calculated in the same manner based on FIG. 1(a) in Non-Patent Literature 1. The result is shown in Table 2.

<Charge and Discharge Test>

A charge and discharge test was conducted for the all solid state batteries obtained in Examples 1 to 6 and Comparative Example 1. The charge and discharge test was conducted in the following procedures: first, the open circuit voltage (OCV) of the all solid state battery one minute or more passed from its fabrication was measured; next, the batteries were discharged to 1.5 V (vs Li/Li$^+$) at C/10 (456 μA/cm$^2$), rest for 10 minutes, and charged to 3.1 V at C/10, under the environment at 60° C. Thereby, the first discharge capacity and the first charge capacity were measured. Also, the difference between the first discharge capacity and the first charge capacity was calculated as the irreversible capacity, and the proportion of the first charge capacity to the first discharge capacity was obtained as the coulomb efficiency. The results are shown in Table 2, FIG. 6, and FIG. 7.

Also, as Reference Example 1, based on the results of charge and discharge curves described in FIG. 4 in Non-Patent Literature 1, the first discharge capacity, the first charge capacity, the irreversible capacity, and the coulomb efficiency were obtained. The results are also shown in Table 2. Incidentally, the result of Reference Example 1 cannot be directly compared to Examples 1 to 6 since the conditions such as the measurement temperature, the weight of the cathode layer, and the current value were different. Meanwhile, it is presumed that Reference Example 1 would show the similar result to that of Comparative Example 1 since the standard value in Reference Example 1 was the same as the standard value in Comparative Example 1.

TABLE 2

|  | Reference Example 1 | Comparative Example 1 | Example 1 | Example 2 | Example 3 | Example 4 | Example 5 | Example 6 |
|---|---|---|---|---|---|---|---|---|
| $S/P_2S_5$ [weight ratio] | 56/44 | 73/27 | 62/38 | 55/45 | 55/45 | 43/57 | 30/70 | 25/75 |
| Charge & discharge current [μAh/cm$^2$] | 640 | 456 | 456 | 456 | 456 | 456 | 456 | 456 |
| Weight [mg/cm$^2$] | 3 | 7.8 | 7.8 | 7.8 | 7.8 | 7.8 | 7.8 | 7.8 |
| Standard value | 1.2 | 1.2 | 1.5 | 1.5 | 1.6 | 1.8 | 2.0 | 2.2 |
| First discharge capacity [mAh/cm$^2$] | 1.90 | 6.00 | 5.40 | 5.01 | 4.39 | 3.26 | 2.88 | 2.51 |
| First charge capacity [mAh/cm$^2$] | 1.39 | 1.47 | 3.97 | 3.47 | 2.84 | 1.88 | 1.39 | 1.21 |
| Irreversible capacity [mAh/cm$^2$] | 0.51 | 4.53 | 1.43 | 1.54 | 1.55 | 1.38 | 1.49 | 1.29 |
| Coulomb efficiency [%] | 73.1 | 24.5 | 73.6 | 69.2 | 64.7 | 57.7 | 48.2 | 48.4 |

Figure 6:
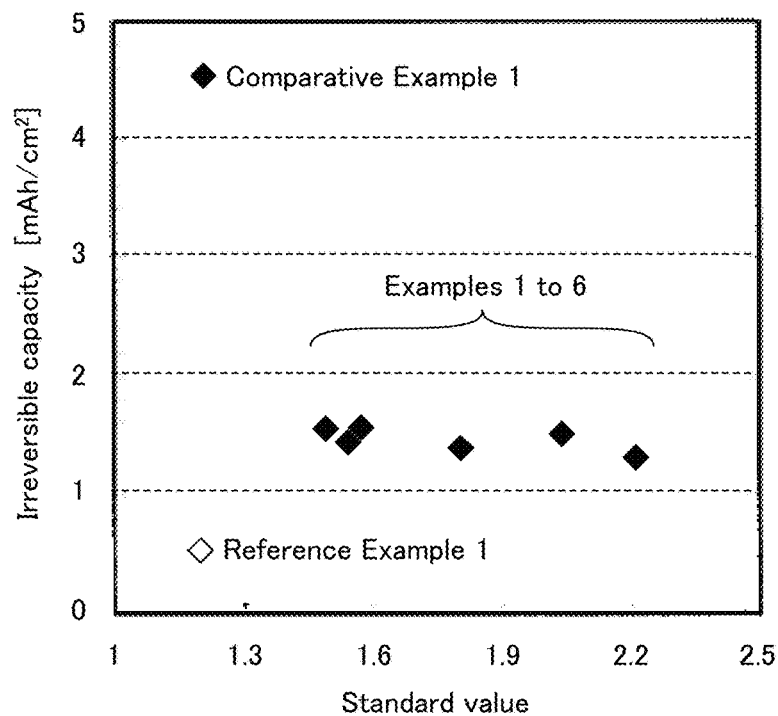
FIG. 6 is the result of a charge and discharge test for the all solid state batteries obtained in Examples 1 to 6, Comparative Example 1, and Reference Example 1.
Figure 7:
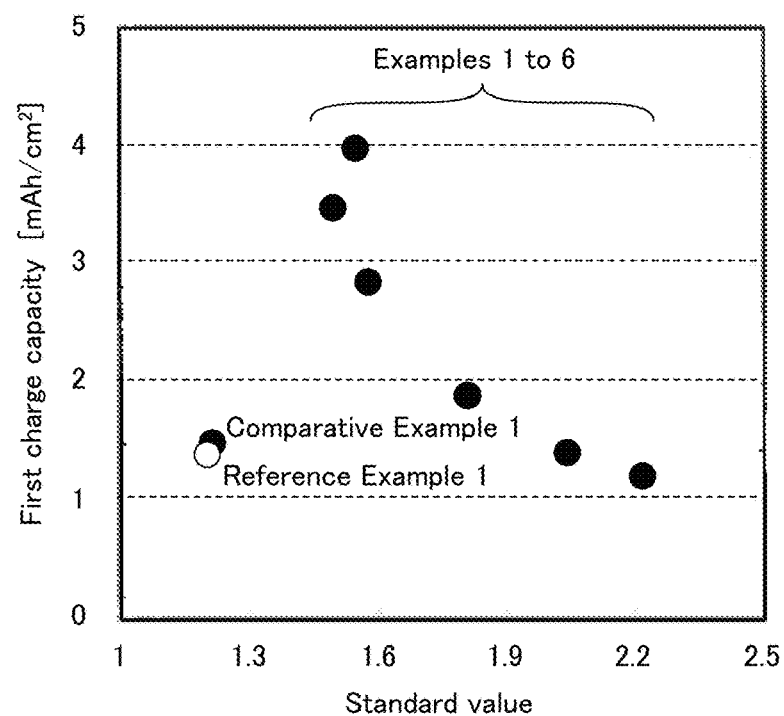
FIG. 7 is the result of a charge and discharge test for the all solid state batteries obtained in Examples 1 to 6, Comparative Example 1, and Reference Example 1.

As shown in Table 2 and FIG. 6, it was confirmed that the irreversible capacity in Examples 1 to 6 was less than that in Comparative Example 1. In particular, although the standard value in Example 1 and the standard value in Comparative Example were close values, the significant effect of sudden drop in the irreversible capacity was obtained. Also, as shown in Table 2 and FIG. 7, it was confirmed that the first charge capacity equal or more to that of Comparative Example 1 was obtained in Examples 1 to 6. In particular, the first charge capacity in Examples 1 to 4 clearly increased more than that in Comparative Example 1.

Incidentally, the standard values in Comparative Example 1 and Reference Example 1 are the same. When the weights in the both are compared, a thick cathode layer was formed in Comparative Example 1, and a thin cathode layer was formed in Reference Example 1. The first charge capacity was the same level in the both, but the irreversible capacity in Comparative Example 1 remarkably increased more than that in Reference Example 1. This fact suggests that the resistance of Li desorption during discharge was high. In other words, it was suggested that the irreversible capacity increased when the standard value is too small, since the Li desorption did not easily occur. On the other hand, as in Examples 1 to 6, the irreversible capacity was presumably decreased by setting the standard value larger than the specific value, which resulted in facilitating the Li desorption.

Example 7

First, a cathode mixture was obtained in the same manner as in Example 3. Next, 101.7 mg of a sulfide solid electrolyte ($Li_2S$—$P_2S_5$-based sulfide solid electrolyte including Li and LiBr) was put in a 1 $cm^2$ mold made of ceramic and pressed at 1 ton/$cm^2$ to obtain a solid electrolyte layer. To one side of the solid electrolyte layer, 7.8 mg (weight: 7.8 mg/$cm^2$) of the cathode mixture was put and pressed at 6 ton/$cm^2$ to fabricate a cathode layer. On the other side, a lithium metal foil as an anode layer was placed and pressed at 1 ton/$cm^2$. After that, an Al foil (cathode current collector) was placed on the cathode layer side, and a Cu foil (anode current collector) was placed on the anode layer side. The first discharge was carried out for the obtained layered body until 1.5 V at the current value of 0.456 mA/$cm^2$ (0.1 C) in the temperature environment at 60° C. Thereby, an all solid state battery was obtained.

Examples 8 and 9

An all solid state battery was respectively obtained in the same manner as in Example 7 except that the environment temperature in the first discharge was changed to 25° C. and 0° C.

[Evaluation]

<Alternating Current Impedance Measurement>

Figure 8A:
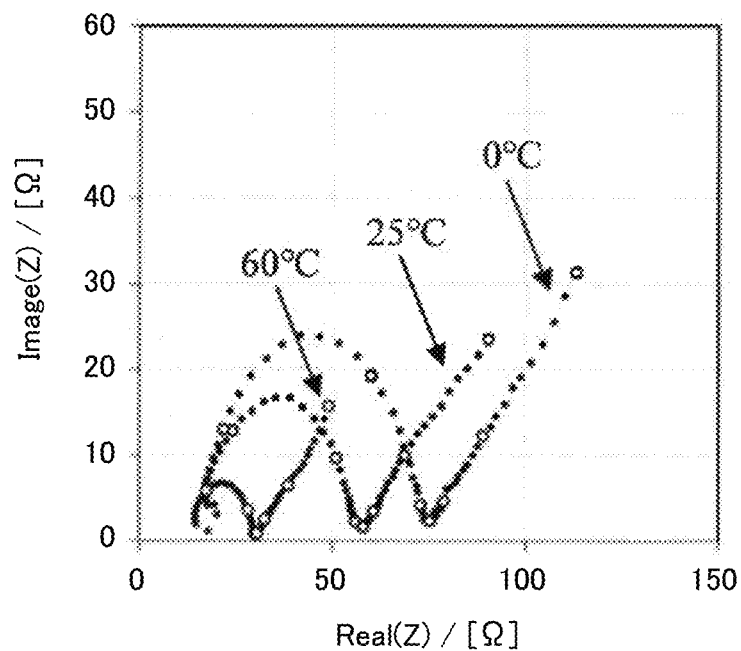
FIGS. 8A and 8B are the results of an alternating current impedance measurement for the all solid state batteries obtained in Examples 7 to 9.
Figure 8B:
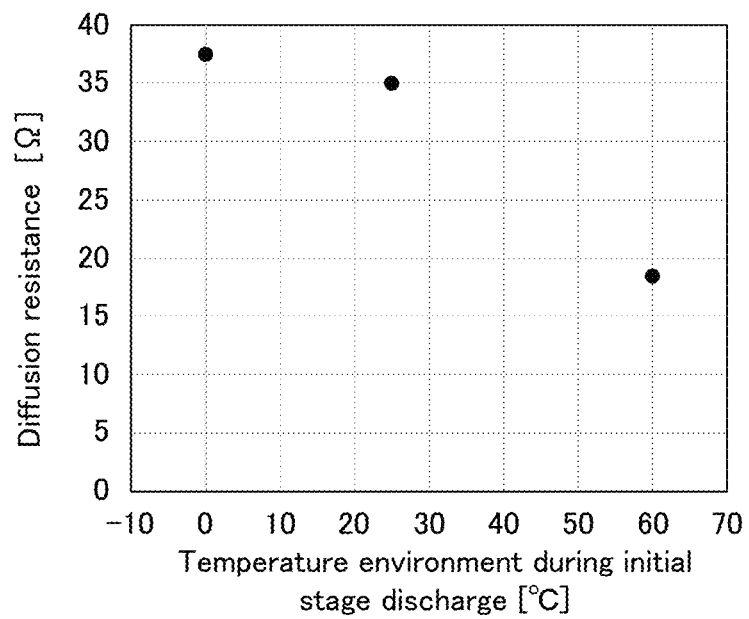

An alternating current impedance measurement was carried out for the all solid state batteries obtained in Examples 7 to 9. The measurement conditions were alternating voltage: ±10 mV, measurement range: 10 MHz to 100 mHz, and measurement temperature: 25° C. The obtained Nyquist plot is shown in FIG. 8A. Also, from the obtained Nyquist plot, resistance was separated and the increased impedance from 100 Hz to 0.1 Hz was determined as diffusion resistance. The result is shown in FIG. 8B. As shown in FIG. 8B, the higher the temperature environment during the first discharge was, the more the resistance diffusion decreased, and it was suggested that the ion conductivity of the cathode layer improved. In other words, it was suggested that the cathode layer with high ion conductivity was obtained by carrying out the first discharge at a high temperature.

<Charge and Discharge Test>

A charge and discharge test was conducted for the all solid state batteries obtained in Examples 7 to 9. The charge and discharge test was conducted in the following procedures. Incidentally, the temperature environment was 25° C., and 1 C corresponds to 4.56 mA/$cm^2$.

(1) A cycle of charge to 3.1 V at 0.1 C, rest for 10 minutes, discharge to 1.5 V at 0.1 C, and rest for 10 minutes was carried out 5 cycles;
(2) Charge to 3.1 V at 0.1 C, rest for 10 minutes, discharge to 1.5 V at 0.33 C, rest for 10 minutes, discharge to 1.5 V at 0.1 C, and rest for 10 minutes;
(3) Charge to 3.1 V at 0.1 C, rest for 10 minutes, discharge to 1.5 V at 1 C, rest for 10 minutes, discharge to 1.5 V at 0.1 C, and rest for 10 minutes;
(4) Charge to 3.1 V at 0.1 C, rest for 10 minutes, discharge to 1.5 V at 2 C, rest for 10 minutes, discharge to 1.5 V at 0.1 C, and rest for 10 minutes; and
(5) Charge to 3.1 V at 0.1 C, rest for 10 minutes, discharge to 1.5 V at 0.1 C, and rest for 10 minutes.

Figure 9:
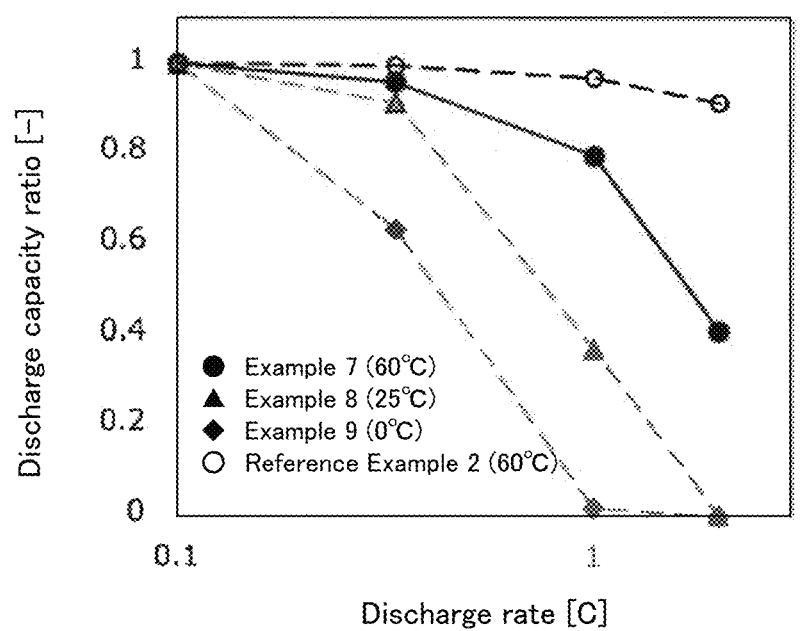
FIG. 9 is the result of a charge and discharge test for the all solid state batteries obtained in Examples 7 to 9.

The discharge capacity ratio was determined from the value of each discharge capacity obtained in the above procedures. In specific, the discharge capacity (discharge capacity at 0.1 C) obtained in procedure (1) was designated as a denominator, and the discharge capacity (discharge capacity at 0.33 C, 1 C, and 2 C) obtained in procedures (2) to (4) was respectively designated as a numerator of the discharge capacity ratio. The result is shown in FIG. 9. As shown in FIG. 9, in all Examples 7 to 9, the discharge capacity ratio decreased when the discharge rate improved, but the higher the temperature environment during the first discharge was, the more the decrease of the discharge capacity ratio was inhibited.

As Reference Example 2, a charge and discharge test was conducted using the all solid state battery obtained in Example 7 in the temperature environment changed from 25° C. to 60° C. The result is also shown in FIG. 9. As shown in FIG. 9, in Reference Example 2, the decrease of the discharge capacity ratio was most inhibited. In this manner, it was confirmed that the problem of the decrease of the discharge capacity ratio did not arise when the temperature environment during the battery usage was a high temperature.

Also, the relation between the temperature environment during the charge and discharge test and the ion conductivity of the cathode layers in the all solid state batteries obtained in Examples 7 and 8 was determined. In Example 7 (temperature environment during the first discharge was 60° C.), the ion conductivity was $3.3*10^{-5}$ S/cm when the temperature environment during the charge and discharge test was 25° C., and the ion conductivity was $1.8*10^{-4}$ S/cm when the temperature environment during the charge and discharge test was 60° C. On the other hand, in Example 8 (temperature environment during the first discharge was 25° C.), the ion conductivity was $1.3*10^{-5}$ S/cm when the temperature environment during the charge and discharge test was 25° C., and the ion conductivity was $4.4*10^{-5}$ S/cm when the temperature environment during the charge and discharge test was 60° C.

Also, the resistance value assuming that Li ion moved 50 μm with these ion conductivity was calculated. As the result, in Example 7 (temperature environment during the first discharge was 60° C.), the resistance value was 150Ω when the temperature environment during the charge and discharge test was 25° C., and the resistance value was 28Ω when the temperature environment during the charge and discharge test was 60° C. On the other hand, in Example 8 (temperature environment during the first discharge was 25° C.), the resistance value was 384 0 when the temperature environment during the charge and discharge test was 25° C., and the resistance value was 40Ω when the temperature environment during the charge and discharge test was 60° C. The resistance difference between Example 7 and Example 8 was 12Ω when the temperature environment during the charge and discharge test was 60° C. On the other hand, the resistance difference between Example 7 and Example 8 was 234Ω when the temperature environment during the charge and discharge test was 25° C. In this manner, it was confirmed that the resistance reduce effect of the discharge capacity ratio was remarkable when the temperature environment during the battery usage was comparatively low temperature.

REFERENCE SIGNS LIST 1 cathode layer
2 solid electrolyte layer
3 anode layer
4 cathode current collector
5 anode current collector
10 all soli state battery

What is claimed is:

1. A cathode mixture comprising:
a cathode active material including a S element;
a sulfur containing compound including a P element and a S element;
a conductive auxiliary material; and
substantially no Li element;
wherein in an X-ray diffraction measurement of the cathode mixture using a CuKα ray, a standard value defined by the following formula is more than 1.2:

$$\text{Standard value} = (I_{15.5} - I_{40})/(I_{25} - I_{40})$$

where:
$I_{15.5}$ is a diffraction intensity at 2θ=15.5°,
$I_{25}$ is a diffraction intensity at 2θ=25°, and
$I_{40}$ is a diffraction intensity at 2θ=40°.

2. The cathode mixture according to claim 1, wherein a proportion of the Li element in the cathode mixture is 0 mol % or more and 20 mol % or less.

3. The cathode mixture according to claim 1, wherein the standard value is 1.5 or more.

4. The cathode mixture according to claim 1, wherein the standard value is 2.2 or less.

5. The cathode mixture according to claim 1, wherein a molar ratio of the P element to the S element (P/S) in the cathode mixture is 0.12 or more and 0.27 or less.

6. The cathode mixture according to claim 1, wherein a carbon material is included as the conductive auxiliary material.

7. An all solid state battery comprising a cathode layer, a solid electrolyte layer, and an anode layer in this order; wherein
the cathode layer comprises a cathode active material including a S element, a sulfur containing compound including a P element and a S element, a conductive auxiliary material, and substantially no Li element; and
in an X-ray diffraction measurement of the cathode layer using a CuKα ray, a standard value defined by the following formula is more than 1.2:

$$\text{Standard value} = (I_{15.5} - I_{40})/(I_{25} - I_{40})$$

where:
$I_{15.5}$ is a diffraction intensity at 2θ=15.5°,
$I_{25}$ is a diffraction intensity at 2θ=25°, and
$I_{40}$ is a diffraction intensity at 2θ=40°.

8. A method for producing a cathode mixture, the method comprising steps of:
a preparing step of preparing a raw material mixture containing a cathode active material including a S element, a sulfide including a P element and a S element, a conductive auxiliary material, and substantially no Li element; and
a mechanical milling step of conducting mechanical milling to the raw material mixture;
wherein in an X-ray diffraction measurement of the cathode mixture using a CuKα ray, a standard value defined by the following formula is more than 1.2:

$$\text{Standard value} = (I_{15.5} - I_{40})/(I_{25} - I_{40})$$

where:
$I_{15.5}$ is a diffraction intensity at 2θ=15.5°,
$I_{25}$ is a diffraction intensity at 2θ=25°, and
$I_{40}$ is a diffraction intensity at 2θ=40°.

9. A method for producing an all solid state battery, the method comprising steps of:
a layered body forming step of forming a layered body including a cathode layer, a solid electrolyte layer, and an anode layer in this order; and
an initial stage discharging step of initially discharging the layered body; wherein
in the layered body forming step, the cathode layer is formed using the cathode mixture according to claim 1; and
in the initial stage discharging step, discharging is carried out in an environment at a temperature of 60° C. or more.

10. The cathode mixture according to claim 1, wherein a proportion of the Li element in the cathode mixture is 0 mol %.

11. The all solid state battery according to claim 7, wherein a proportion of the Li element in the cathode layer is 0 mol %.

12. The method for producing a cathode mixture according to claim 8, wherein a proportion of the Li element in the raw material mixture is 0 mol %.

13. The method for producing a cathode mixture according to claim 8, wherein the mechanical milling is conducted for 48 hours or more.

\* \* \* \* \*